United States Patent [19]

Koda et al.

[11] Patent Number: 5,749,083
[45] Date of Patent: May 5, 1998

[54] DOCUMENT PROCESSING SYSTEM

[75] Inventors: Yasunori Koda; Tsuyoshi Tanaka, both of Ebina, Japan

[73] Assignee: Fuji Xerox Co., Ltd., Tokyo, Japan

[21] Appl. No.: 521,451

[22] Filed: Aug. 30, 1995

[30]   Foreign Application Priority Data

Sep. 9, 1994  [JP]  Japan .................... 6-240896

[51] Int. Cl.⁶ .................... G06F 17/24; G06F 17/21
[52] U.S. Cl. .................... 707/530; 364/400; 707/500; 707/517
[58] Field of Search .................... 364/400; 395/761, 395/766, 767, 768, 769, 779, 784, 785, 792, 943; 707/500, 505, 506, 507, 513, 517, 522, 530

[56]   References Cited

U.S. PATENT DOCUMENTS

| | | | |
|---|---|---|---|
| 4,809,220 | 2/1989 | Carlson et al. | 395/117 |
| 5,144,555 | 9/1992 | Takadachi et al. | 395/792 |
| 5,425,138 | 6/1995 | Kumakawa | 395/771 |
| 5,566,289 | 10/1996 | Ikeo et al. | 395/779 |
| 5,608,857 | 3/1997 | Ikeo et al. | 395/761 |
| 5,640,501 | 6/1997 | Monroe | 707/507 |
| 5,640,577 | 6/1997 | Scharmer | 707/507 |
| 5,671,429 | 9/1997 | Tanaka | 707/530 |

FOREIGN PATENT DOCUMENTS

| | | |
|---|---|---|
| A-5-101052 | 4/1993 | Japan . |
| A-5-108641 | 4/1993 | Japan . |
| A-6-12408 | 1/1994 | Japan . |

*Primary Examiner*—Edward R. Cosimano
*Attorney, Agent, or Firm*—Oliff & Berridge, P.L.C.

[57]   ABSTRACT

The document processing system stores document forms which can be chosen by the user based on the specification of document attributes such as the purpose and distributees of document or on the finished styles of document, and displays the selected document form. The system enables the user to determine a proper document form easily and swiftly without the need of instructing a detailed document design and write the intended document in the displayed form.

16 Claims, 13 Drawing Sheets

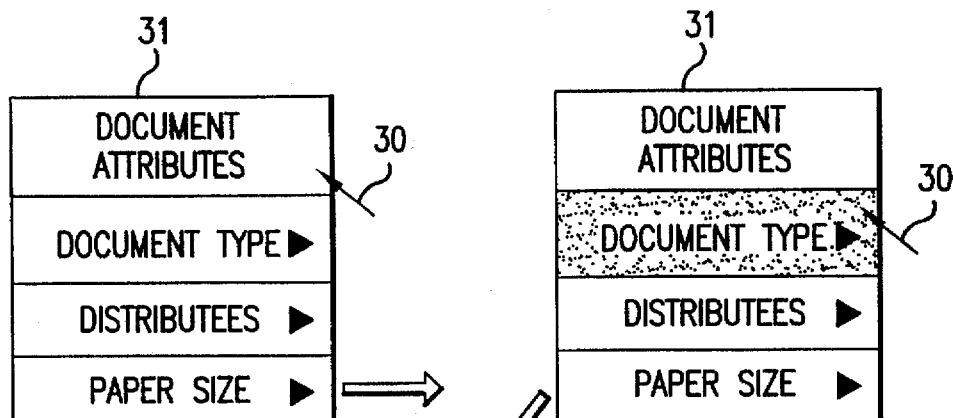
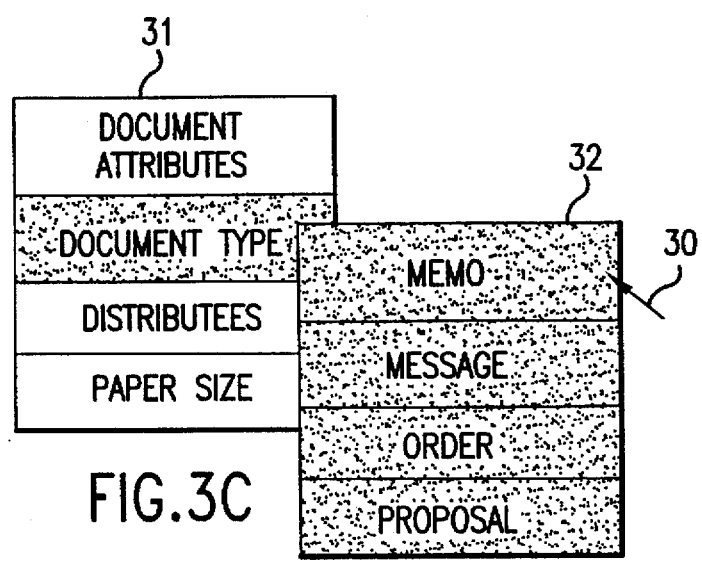
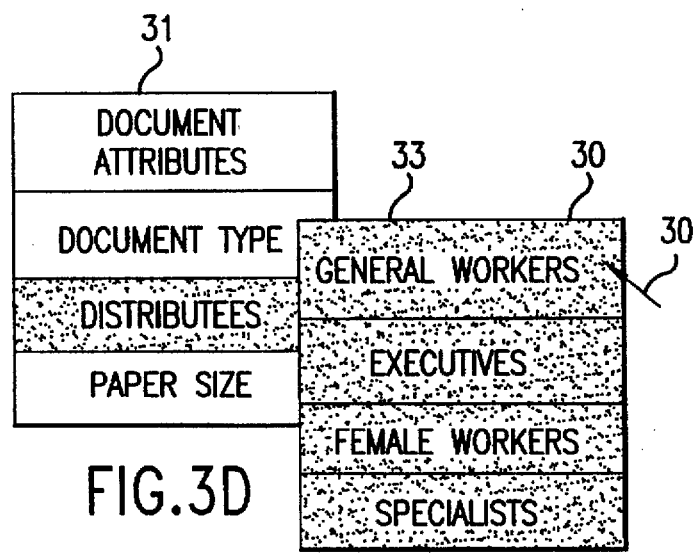

FORM (1,1)                                                50

| | CATEGORY | OUTWORK   SEMINAR   CONFERENCE   OTHER |
|---|---|---|
| I M | TIME | |
|  | PLACE | |
| INFORMATION MEMORANDUM | OTHER PARTY | |
| | REPORTER | SECTION                     NAME |

| SUBJECT | |
|---|---|

FORM (2,1)                                                51

SECRECY   YES   NO         MESSAGE
URGENCY   YES   NO     DISTRIBUTEES _____
STAFF

| NO. | |
|---|---|
| DATE OF ISSUE | |
| SECTION | |
| NAME | |

| SUBJECT | | | | |
|---|---|---|---|---|

| DOCUMENT DESIGN PARAMETERS | ENTER | DELETE | DEFAULT | | |
|---|---|---|---|---|---|
| DOCUMENT TYPE | MESSAGE | FINISHED STYLES | | | |
| FRONT PAGE PROPERTY | | | | | |
| SUBJECT | CENTER | FORMALITY | STANDARD | | |
| FACE | BOLD | EMPHASIS | STANDARD | | |
| CHARACTER WIDTH | 2 | FANCY | STANDARD | | |
| PARAGRAPH | LEFT-JUSTIFIED | OPERATIVENESS | STANDARD | | |
| CHARACTER TYPE | MING-STYLE TYPE | | | | |
| CHARACTER WIDTH | 4 | | | | |
| LEFT MARGIN | 0 | | | | |
| RIGHT MARGIN | 1 | | | | |

FIG.17 ent writing support system described in the patent Laid-
DOCUMENT PROCESSING SYSTEM

BACKGROUND OF THE INVENTION

1. Field of the Invention

The present invention relates to a document processing system, and particularly to a document processing system which is capable of enabling the user to finish a document to meet the user's intention and purpose by utilization of the knowledge on the editorial design of documents, and capable of designing a document precisely and swiftly without the need of user's detailed instruction, thereby supporting the document writing effectively.

2. Description of the Prior Art

Recent personal computers and work stations having advanced DTP (Desk Top Publishing) functions and prevailing document writing systems such as word processors have enabled users to write high-quality and sophisticated documents easily during the ordinary office work. Some document writing systems available recently are provided with high-grade editing functions which allow extensive choice of document design parameters including the page layout, character type and character size, enabling skilled and experienced users to write intended high-quality documents at a reasonable time expenditure.

However, it is necessary for ordinary users, who intend to write documents by using high-performance document writing systems, to learn the complex manner of operation. It is difficult for these users to understand the setting of document design parameters in terms of numeric values, e.g., the positions of the title and subtitles, right and left margins and character size, required in using the versatile document writing functions. On this account, despite the easy accessibility to the sophisticated document writing functions included in the prevailing document writing systems, most users cannot fully benefit from these functions and have to content in reality to write poor-quality, poor-appearance documents.

For dealing with this matter, there have been developed document writing systems having support functions which enable users without the knowledge of editorial design to write high-quality, good-appearance documents which meet the user's intention and purpose by making reference to the knowledge database. Examples of these document writing systems with support functions are disclosed in Japanese patent Laid-Open Nos. Hei 5-101052 and Hei 5-108641. A method proposed in another Japanese patent Laid-Open No. Hei 6-12408 is intended to design a document by calculating parameters from the relational formulation which links the finished style of document specified by the user to certain document design parameters.

However, it is necessary for the above-mentioned document writing support system described in the patent Laid-Open No. Hei 5-101052 and the document style designing support system described in the patent Laid-Open No. Hei 5-108641 to store abundant knowledge data in the knowledge database in order to have settings for the complete accomplishment of the user's intention, and these systems have another problem of excessive time expenditure in dealing with an increased amount of data in the document designing process.

The above-mentioned document designing method described in the patent Laid-Open No. Hei 6-12408 needs to deal with an intricate relational formulation in order to accomplish a proper document design which meets the user's intention, and it has a problem of excessive time expenditure in putting input data into the relational formulation and calculating document design parameters.

Moreover, these systems used to determine a document form or document design parameters have another problem of the incapability of showing the expected design form on the display screen for allowing the user to verify the document design before writing a document. Still another problem of the above-mentioned document writing support system is that an established document design form cannot easily be modified.

SUMMARY OF THE INVENTION

The present invention is intended to overcome the foregoing prior art deficiencies, and its prime object is to provide a document processing system which is capable of enabling the user to finish a document to meet the user's intention and purpose by utilization of the knowledge on the editorial design of documents and capable of designing a document precisely and swiftly without the need of user's detailed instruction, thereby supporting the document writing effectively.

In order to achieve the above objective, the document processing system based on this invention comprises a document design information storage means for storing document design information in correspondence to document attributes, a document attribute input means for entering document attributes indicative of the properties of document design derived from the purpose of document, distributees of document and shape of document, a document design selection means for selecting document design information provided by the document design information storage means in accordance with the entered document attributes, and a display means for displaying a document form based on the selected document design information.

The document processing system of this invention further includes a finished style input means for entering finished styles indicative of the properties of finished document styles, and the document design selection means selects document design information based on the entered finished styles of document as parameters in addition to the entered document attributes.

In the document processing system of this invention, the document design information storage means stores document design information in correspondence to document attributes, the document attribute input means enters document attributes indicative of the properties of document design derived from the purpose of document, distributees of document and shape of document, the document design selection means selects document design information provided by the document design information storage means in accordance with the entered document attributes, and the display means displays a document form based on the selected document design information.

In the document processing system of this invention which further includes a finished style input means, the finished style input means enters finished styles indicative of the properties of finished document styles, and the document design selection means selects a document design form based on the entered finished styles as parameters in addition to the entered document attributes.

Consequently, the user having no knowledge of document design can swiftly choose a proper document design which meets the user's intention and purpose without the need of providing a detailed instruction, but by simply entering document attributes indicative of the properties of document design derived from the purpose, distributees and shape of document through the document attribute input means, and entering finished styles indicative of the properties of finished document styles through the finished style input means. The user can proceed to write a document by confirming the document form displayed by the document form display means based on the selected document design information.

Based on the storing of document forms or document design parameters in correspondence to document attributes, the user can select a document form or document design parameters by specifying document attributes and can view the displayed document form, and thereafter can write a document by simply following the document form. Document forms or document design parameters are used directly as the document design information, and the user can easily modify the information.

BRIEF DESCRIPTION OF THE DRAWINGS

FIGS. 3A to 3D are a set of diagrams used to explain the operational manner of specifying document attributes for selecting a versatile memo-wise document form;

FIGS. 5A and 5B are diagrams used to explain specific examples of memo-wise document form;

FIG. 17 is a diagram used to explain the display screen of selected document design parameters.

DESCRIPTION OF THE PREFERRED EMBODIMENTS

Specific embodiments of the present invention will be explained with reference to the drawings.

Figure 1:
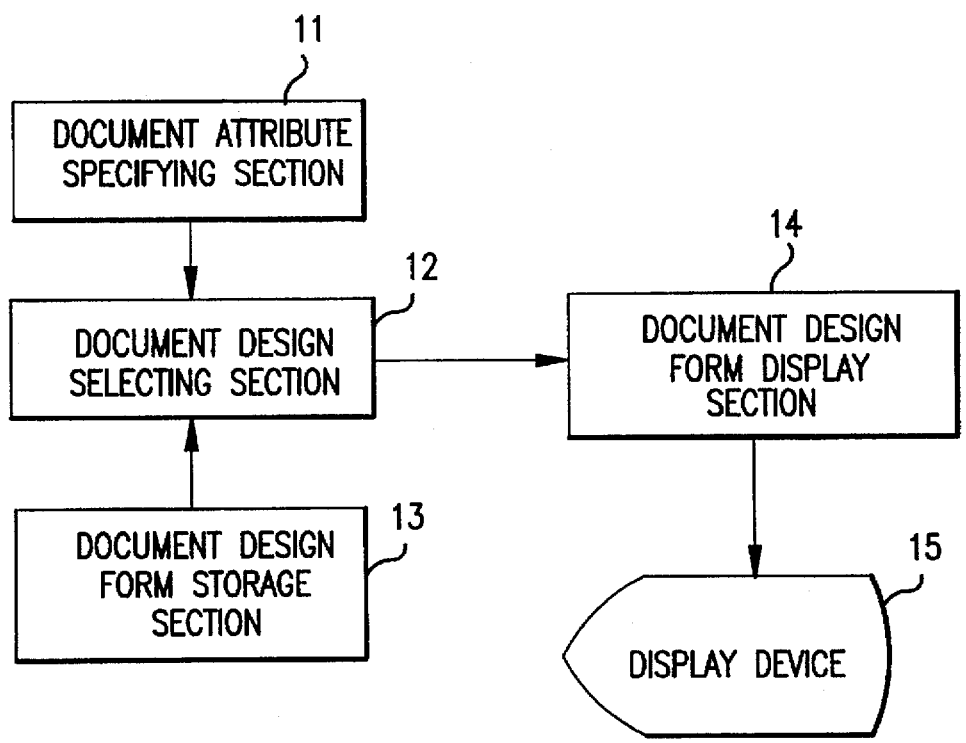
FIG. 1 is a block diagram showing the principal arrangement of the document processing system based on a first embodiment of this invention.

FIG. 1 is the block diagram of the document processing system based on the first embodiment of this invention. The document processing system consists of a document attribute specifying section 11, a document design selecting section 12, a document design form storage section 13, a document design form display section 14, and a display device 15.

The document attribute specifying section 11 is to enter document attributes indicative of the properties of document design derived from the purpose of document, distributees of document and shape of document. The user who may not have the knowledge of document design specifies document attributes such as the purpose of document and the size of paper in consideration of the content of document, instead of instructing a detailed document design.

The document attribute specifying section 11 includes a mouse device or cursor key and a graphical user interface module. The user points selection keys among icons of keys displayed on the CRT screen to specify parameters of document attributes thereby to select a proper document design which meets the user's intention and purpose.

The document design form storage section 13 stores document forms as information of typical document designs in correspondence to document attributes. The document design form storage section 13 has a structure of a lookup table, in which document design forms are stored in correspondence to document attributes as arguments, and the maintenance of the document design forms can easily be done by the user.

The document design selecting section 12 uses the values of document attributes (document attributes are represented by integers) provided by the document attribute specifying section 11 to fetch a document design form from the document design form storage section 13, and delivers it in the form of template to the document design form display section 14. The document design form display section 14 displays the template of document form on the display device 15. Once the template of document design form, e.g., memo-wise document form, is displayed on the display device 15, the user can easily proceed to write a memo by simply putting the content of memo in the displayed document design form without being distressed to determine the layout of the memo.

Figure 2:
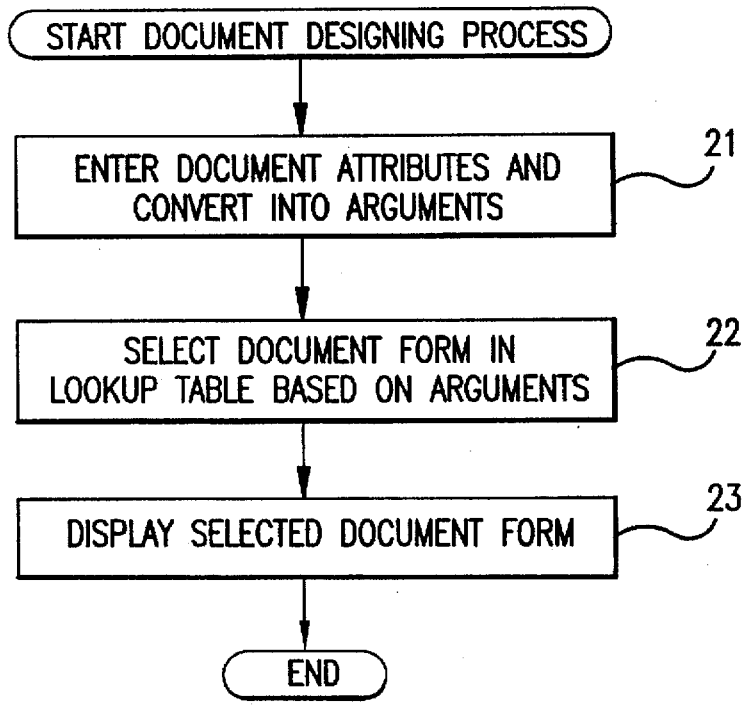
FIG. 2 is a flowchart showing the overall processing of the document designing process based on the first embodiment.

Next, the document designing process conducted by the document processing system arranged as described above will be explained with reference to the flowchart of FIG. 2.

After the document designing process has started, the user enters document attributes, and these attributes are converted into arguments in step 21. At the entry of document attributes, the input function of the graphical user interface, for example, is used to display hierarchical menus for the easiness of setting operation. The user specifies a series of document attributes for the type of document, distributees of document, size of paper, etc. by following the menus, and the entered values are converted into arguments of the lookup table.

The next step 22 selects a template of document form corresponding to the specified document attributes in the lookup table in accordance with the arguments, and the last step 23 displays the selected template of document form. The user uses the displayed template of document form to write the intended document.

Figure 4:
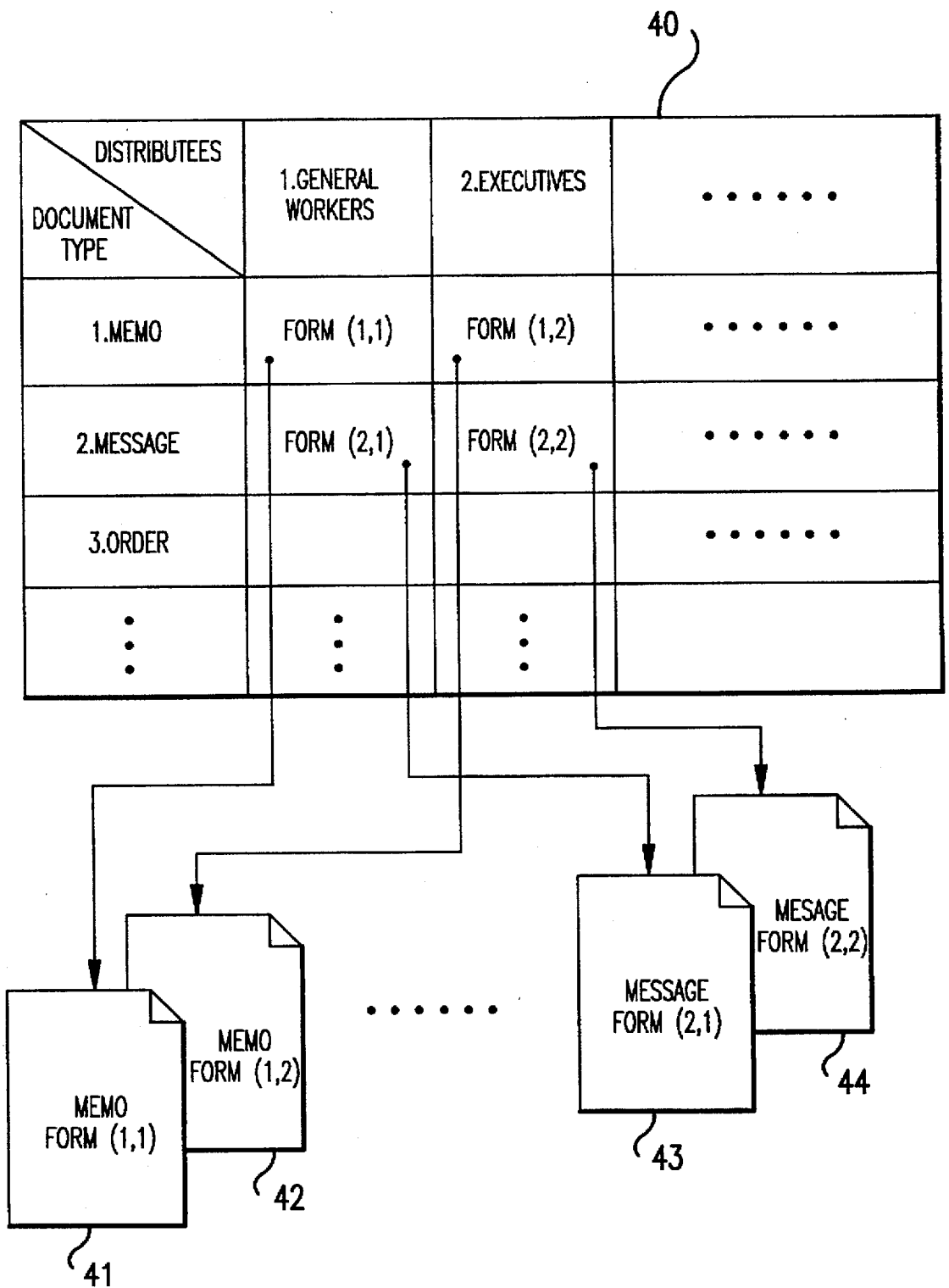
FIG. 4 is a diagram explaining the structure of the lookup table which stores memo-wise document forms.

Next, the user's operation for specifying a memo-wise document form, for example, based on the above-mentioned document designing process will be explained more specifically in connection with FIGS. 3A to 3D, FIG. 4 and FIGS. 5A and 5B. FIGS. 3A to 3D are diagrams explaining the user's operation for specifying document attributes of a versatile memo-wise document form, FIG. 4 is a diagram explaining the structure of the lookup table which stores memo-wise document forms, and FIGS. 5A and 5B are diagrams explaining specific examples of document forms.

Initially, the user who intends to write a memo initiates the WYSIWYG document editor. The user places the mouse pointer 30 as shown in FIG. 3A to open the document attribute menu 31. Next, the user places the mouse pointer 30 on the item "document type" as shown in FIG. 3B, and clicks the mouse button. Consequently, the item "document type" is selected, and a sub-menu 32 which belongs to the item "document type" is displayed as shown in FIG. 3C.

The user places the mouse pointer 30 on the item "memo" in the sub-menu 32 and clicks the mouse button thereby to determine the document type to be memo. Consequently, the attribute value of "memo" is entered for the document attribute pertinent to the document type.

Subsequently, the user places the mouse pointer 30 on the item "distributees" in the document attribute menu 31 and clicks the mouse button for the setting of the document attribute pertinent to the distributees. A sub-menu 33 which belongs to the item "distributees" is displayed, and the user selects the item "general workers" in the sub-menu as shown in FIG. 3D.

In the user's item selecting operation in the sub-menus, the user places the mouse pointer 30 on the item to be selected and clicks the mouse button, then the pointed item is entered and the sub-menu goes off. Each selected item is converted by the document attribute specifying section 11 into an argument of integer for the lookup table. Specifically, "memo" of the document type is converted to "1" and "general workers" of the distributees is converted to "1", and these arguments are delivered to the document design selecting section 12. The document design selecting section 12 uses the values (1, 1) to read out a template of document form from the lookup table in the document design form storage section 13.

The document design form storage section 13 stores document design forms 41, 42, 43 and 44 including memo-wise document forms in the lookup table 40 as shown in FIG. 4. The lookup table 40 is a multi-dimensional table in which document design forms are classified in terms of the document attribute which characterizes individual documents, and document attribute values are used to address each storage location so that each document design form 41, 42, 43 or 44 is read out accordingly. For example, when the document type and distributees are specified to be "memo" and "general workers", respectively, the memo-wise document form 41 with pointer address (1, 1) is read out of the lookup table 40. A memo 42 to be distributed to executives, a message 43 to be distributed to general workers and a message 44 to be distributed to executives are read out of the lookup table 40 in the same manner. The readout document design form is delivered to the document design form display section 14.

Alternatively, a document design form may be produced by reading out a document form from the original file stored in the document design form storage section 13 and converting it depending on the file format of the document editor.

The document design form display section 14 displays the memo-wise document form 41 on the CRT display device 15. The document form with the document attribute values (1, 1) for a memo to be distributed to general workers is as shown by 50 in FIG. 5A, and the document form with the document attribute values (2, 2) for a message to be distributed to executives is as shown by 51 in FIG. 5B.

Document attributes of various other document forms are selected in the same manner by the user's operation based on the hierarchical menus, and are treated in terms of the numeric information (m, n). The numeric information (m, n) is used as arguments for searching the lookup table 40 as shown in FIG. 4 to read out a selected document form, and it is displayed on the display screen. The number of arguments which characterize individual documents is not confined to three that is the case of the example of FIG. 3, but it is arbitrary.

According to the document processing system based on the first embodiment of this invention, the user who intends to write a document selects a document design form by specifying document attributes in the hierarchical menus. The system selects a document design form in the document design form storage section 13 in accordance with document attribute values which represent the type of document, such as a memo, message, contract, etc., and paper size, and displays it. Consequently, the user who may not have any knowledge of document design can have a proper document form which meets the intended document by merely entering document attributes which characterize the document, such as the purpose of document and paper size, and can write the document easily by putting the content of document in the form.

In addition to the items of property including the purpose, distributees and shape of a document to be written used in terms of the document attribute value for selecting a document design form, more subjective items of property such as the formality, fancy, etc. may be included, as will be explained for the second embodiment of the document processing system.

Figure 6:
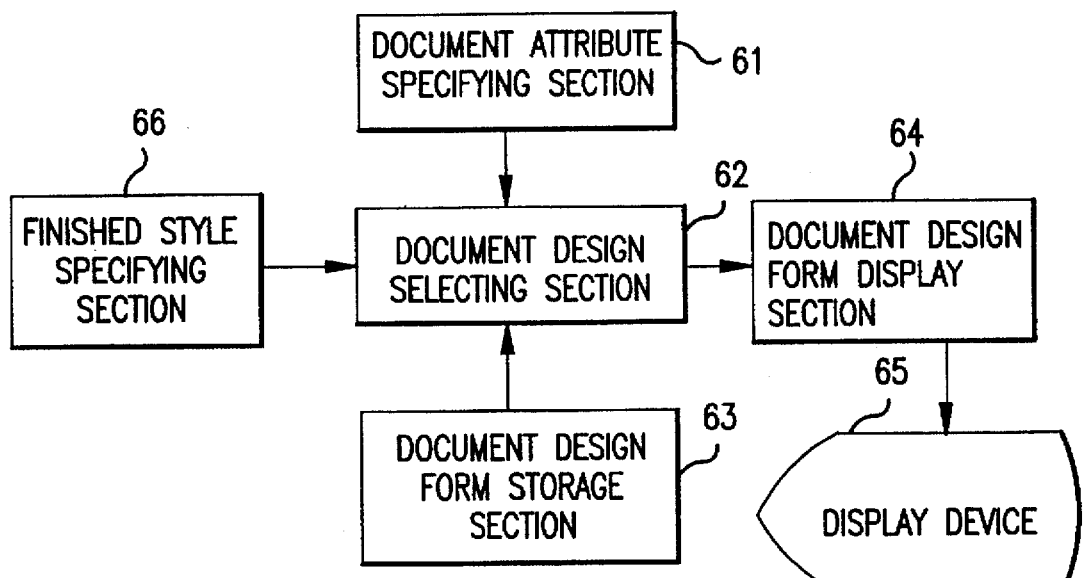
FIG. 6 is a block diagram showing the principal arrangement of the document processing system based on a second embodiment of this invention.

FIG. 6 is the block diagram of the document processing system based on the second embodiment of this invention. The document processing system consists of a document attribute specifying section 61, a document design selecting section 62, a document design form storage section 63, a document design form display section 64, a display device 65, and a finished style specifying section 66. Among these functional blocks, the document attribute specifying section 61, document design selecting section 62, document design form storage section 63, document design form display section 64 and display device 65 are identical to the document attribute specifying section 11, document design selecting section 12, document design form storage section 13, document design form display section 14 and display device 15 of the document processing system of the preceding first embodiment shown in FIG. 1.

The document processing system of the second embodiment is derived from the first embodiment, with the finished style specifying section 66 being added. The finished style specifying section 66 enables the user to select a document design form based on the subjective properties of a document to be written such as the formality, emphasis and fancy in addition to the document attributes treated by the document attribute specifying section 61 as the first input section.

The document design selecting section 62 reads out a document design form from the document design form storage section 63 by using the document attributes (integers) provided by the document attribute specifying section 61 and also in response to levels of finished styles (integers) provided by the finished style specifying section 66. The document design form fetched by the document design selecting section 62 is delivered in the form of a template to the document design form display section 64.

The document design form display section 64 displays the template of document design form, which corresponds to the specified document attribute values and specified finished style levels, on the display device 65. For example, when the user specifies the selection of a template of document design form for writing a message of high formality, the user can easily write the message of high formality to be distributed to executives by simply putting the content of message in the displayed document form without being distressed to determine the layout of the message.

Figure 7:
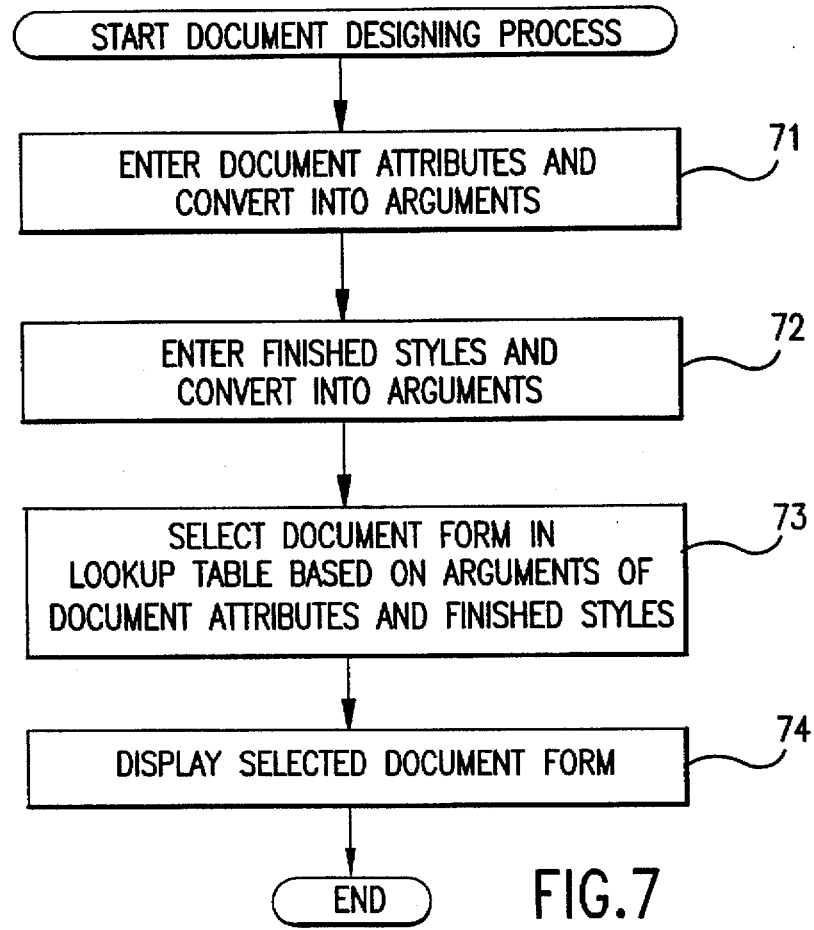
FIG. 7 is a flowchart showing the overall processing of the document designing process based on the second embodiment.

Next, the document designing process conducted by the document processing system arranged as described above will be explained with reference to the flowchart of FIG. 7.

After the document designing process has started, the user enters document attributes, and these attributes are converted into arguments in step 71. At the entry of document attributes, the input function of the graphical user interface, for example, is used to display hierarchical menus for the easiness of setting operation as in the case explained in connection with FIGS. 3A–3D. The user specifies a series of document attributes for the purpose of document, type of document, distributees of document, size of paper, etc. by following the menus, and the entered values of document attributes are converted into arguments of the lookup table.

In the next step 72, the user enters finished style levels, and these are converted into arguments. Also at the entry of finished style levels, the input function of the graphical user interface is used to display hierarchical menus for the easiness of setting operation. The user specifies a series of finished styles including the formality, emphasis, fancy, operativeness, etc. by following the menus, and the entered levels of styles are converted into arguments of the lookup table in the same manner as for the document attributes.

The next step 73 combines the two kinds of arguments for addressing the lookup table and reads out a document form template which corresponds to the specified document attribute values and finished style levels, and the last step 74 displays the selected template of document form.

Figure 8A:
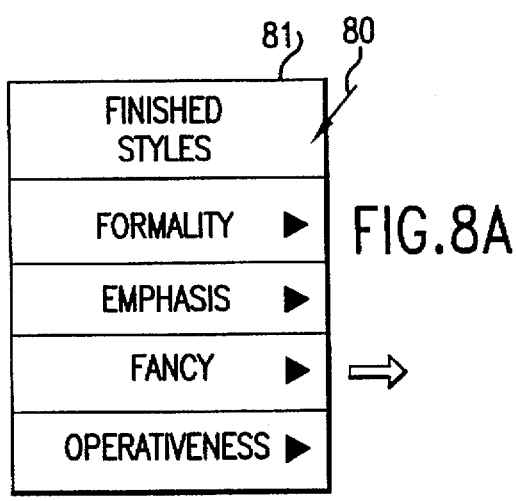
FIGS. 8A to 8D are a set of diagrams used to explain the operational manner of specifying finished styles for selecting a document design form.
Figure 8B:
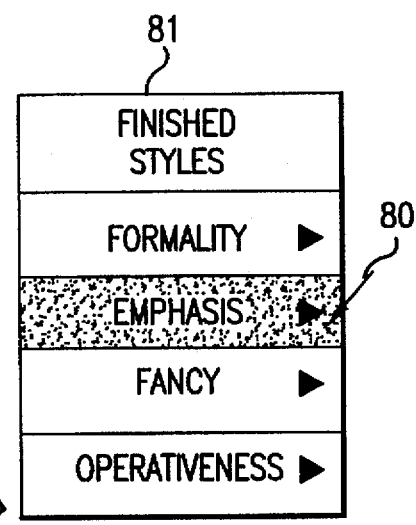
Figure 8C:
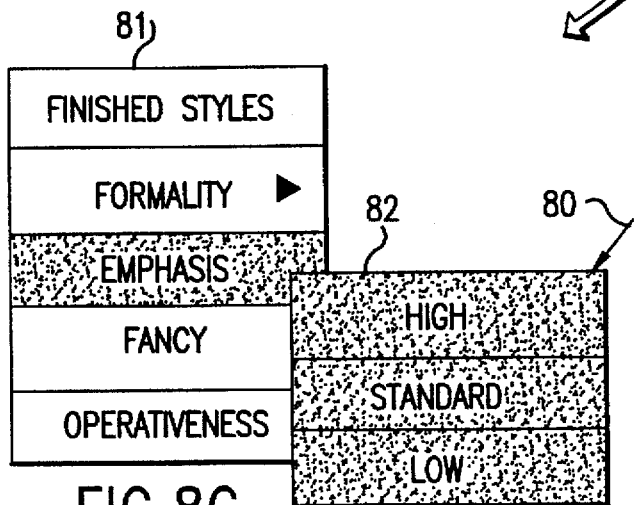
Figure 8D:
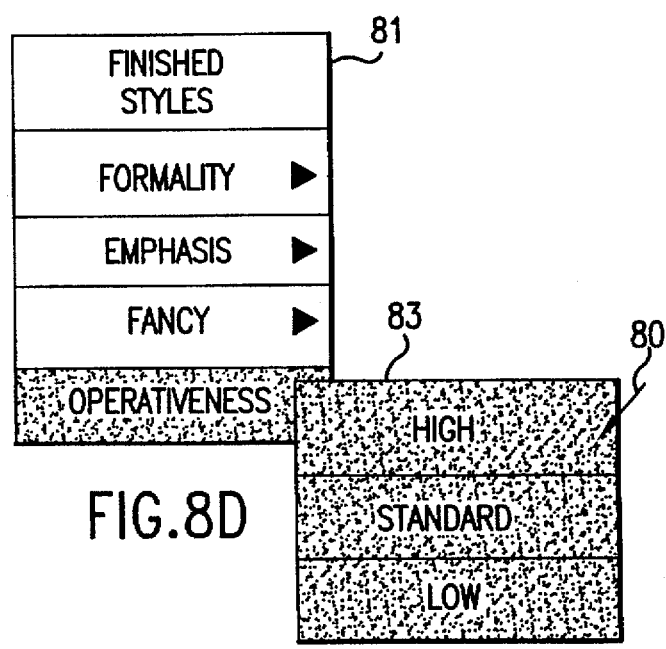
Figure 9:
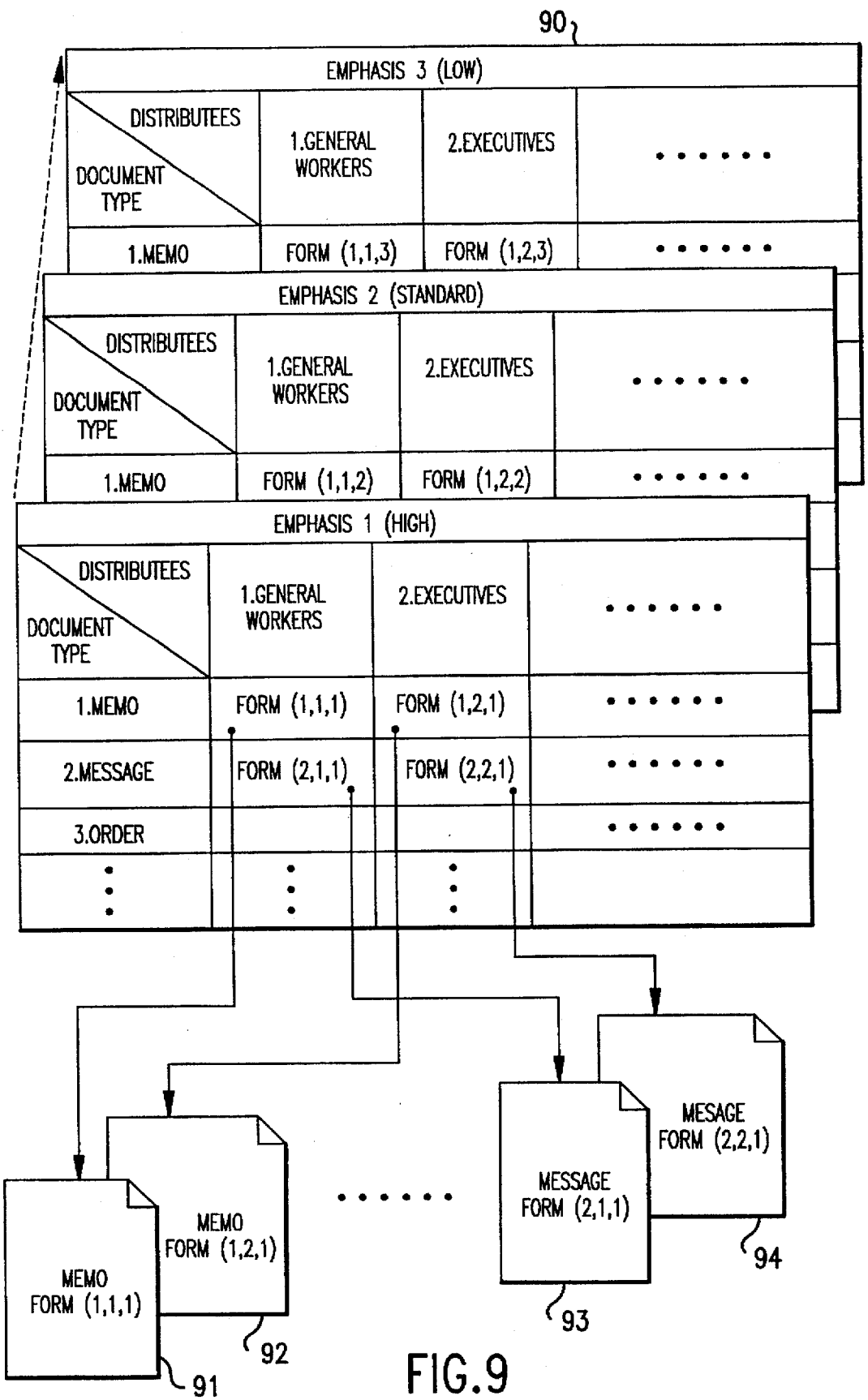
FIG. 9 is a diagram explaining the structure of the lookup table which stores document design forms which reflect finished styles.

Next, the user's operation for specifying a memo-wise document form, for example, based on the above-mentioned document designing process based on the finished style levels will be explained more specifically in connection with FIGS. 8A to 8D and FIG. 9. FIGS. 8A to 8D are diagrams explaining the user's operation for selecting a document form by specifying finished style levels, and FIG. 9 is a diagram explaining the structure of the lookup table which stores document design forms which reflect a variety of finished styles.

Initially, the user who intends to write a document initiates the WYSIWYG document editor. The user operates on the document attribute specifying section 61 to specify document attributes in the same manner as the first embodiment, and next proceeds to specify finished style levels. The user operates on the finished style specifying section 66 to open the menu 81 for setting finished styles as shown in FIG. 8A. When the menu 81 is opened, the mouse pointer 80 turns to point the left-downward direction indicative of the finished style setting mode.

The finished style menu 81 includes items of formality, emphasis, fancy and operativeness as shown in FIG. 8A. The user places the mouse pointer 80 on the item "emphasis" as shown in FIG. 8B for example, and clicks the mouse button. Consequently, the specification for emphasis is selected, and the sub-menu 82 for setting an item of emphasis is displayed as shown in FIG. 8C. The user proceeds to specify the item "high" for the level of emphasis.

Subsequently, the user specifies the remaining finished style levels for the formality, fancy and operativeness in the same manner. For example, for setting the level of operativeness, the user places the mouse pointer on the item "operativeness" in the menu and clicks the mouse button, and next points the item "high" for example in the sub-menu 83 of operativeness as shown in FIG. 8D.

In the user's item selecting operation based on sub-menus, the user places the mouse pointer 80 on an item to be selected and clicks the mouse button, then the pointed item is entered and the sub-menu goes off. Each selected item is converted by the finished style specifying section 66 into an argument of integer for the lookup table. Specifically, items "high", "standard" and "low" are converted to "1", "2" and "3", respectively, and these arguments are delivered to the document design selecting section 62. The document design selecting section 62 uses these values together with the document attribute values specified previously to read out a document design form from the lookup table in the document design form storage section 63.

The document design form storage section 63 stores document design forms 91, 92, 93 and 94 including memo-wise document forms in the lookup table 90 as shown in FIG. 9. The lookup table 90 is a multi-dimensional table in which document design forms are classified in terms of the document attribute which characterizes individual documents and in terms of the finished style level. The document attribute values and finished style levels are used to address each storage location so that the document design form 91, 92, 93 or 94 is read out accordingly.

In the example of FIG. 9, when the document type and distributees among document attributes are specified to be "memo" and "general workers", respectively, and the emphasis among finished styles is specified to be "high", the memo-wise document form 91 with pointer address (1, 1, 1) is read out of the lookup table 90. A memo 92 to be distributed to executives, a message 93 to be distributed to general workers and a message 94 to be distributed to executives, all having "1" (high) emphasis level, are read out in the same manner. The readout document design form 91 is delivered to the document design form display section 64, and displayed on the CRT display device 65.

Finished style levels (i, . . . , 1) of various other document forms are selected in the same manner by the user's operation based on the hierarchical menus following the specification of document attributes (m, . . . , n), and the resulting two-group values are treated in terms of the numeric information (m, . . . , n, i, . . . , 1). The numeric information (m, . . . , n, i, . . . , 1) is used as arguments for searching the lookup table 90 as shown in FIG. 9 to read out a selected document form, and it is displayed on the display screen.

The number of finished styles which characterize individual documents is not confined to four (formality, emphasis, fancy, operativeness) that is the case of the example of FIGS. 8A–8D, but it is arbitrary. The number of levels of finished style is not confined to three (high, standard, low) that is the case of the example of FIGS. 8C and 8D, but it is arbitrary.

The document design form storage section 63 is constituted by the lookup table 90, from which a document design form is read out by using arguments of document attributes and arguments of finished styles. The total volume of the lookup table 90 is determined from the number of items of document attributes, the number of items of each document attribute, the number of items of finished styles, and the number of levels of each finished style, and the lookup table is generally formed of a table having n-th order arguments.

The finished styles (and levels) are related to the document design parameters, such as character size and margins in connection with titles and subtitles, in various relational formulations that are determined based on the subjective assessment schemes and rules as described in the article entitled "Knowledge Acquisition for the Support of Basic Document Style Design" in the proceeding 4C-6 of the 44-th (1992) annual convention of the Information Processing Society of Japan for example.

The document design form storage section 63 stores a variety of document design forms as templates in correspondence to document attribute values and finished style levels, and a template is read out in response to the entry of values and levels (arguments). Each document design form is created and stored in advance by the calculation of the relational formulations mentioned above, instead of being calculated at each entry of document attribute values and finished style levels by the user. Specifically, the document design form storage section 63 is arranged in the form of a lookup table which contains document attribute values and finished style levels as parameters (arguments) and document design forms as templates, and the table releases a document design form by being addressed by a set of parameters (arguments). On this account, it is possible for the user to determine a document design and read out a relevant document design form in a short time. It is also possible to carry out the maintenance of the lookup table and the alteration of document design information.

The document writing support process will be explained by taking a specific example.

Initially, the user opens the menu of document attributes as shown in FIG. 3A, and selects the item "message" in the sub-menu of document type in the same manner as the first embodiment. The user next selects the item "general workers" in the sub-menu of distributees. The document attribute specifying section 61 converts the selected items "message" and "general workers" into integers "2" and "1", respectively, and delivers the arguments (2, 1) to the document design selecting section 62.

Subsequently, the user opens the menu of finished styles, selects the items "formality", "emphasis", "fancy" and "operativeness" sequentially as shown in FIGS. 8A to 8D, and selects the level "standard" in the respective sub-menus. The finished style specifying section 66 converts the selected level "standard" into integer "2", and delivers the values to the document design selecting section 62. The document design selecting section 62 uses the received two-group values as arguments to read out a template of document design form (message) that corresponds to the selected document attribute values and finished style levels from the lookup table in the document design form storage section 63, and delivers the data in the relevant document file of the document editor to the document design form display section 64. The document design form display section 64 displays the document in the document file on the display device 65.

The lookup table 90 shown in FIG. 9 is only the portion of the emphasis as a finished style. Actually, the complete lookup table 90 includes the remaining portions of the formality, fancy and operativeness as finished styles, which are not shown in the figure, and the table 90 contains document design forms for all combinations of arguments of the document attributes and finished styles.

The document design form display section 64 displays the selected document design form on the CRT display screen. In the example of FIG. 9, the document form for a message with arguments (2, 1, 2) is displayed as a document file by the document editor (a file of the message is not explicitly shown in FIG. 9), and the user can write the content of message directly into the file.

As another example of operation, the user selects the item "message" for the document type and the item "general workers" for the distributees as shown in FIGS. 3C and 3D, and the document attribute specifying section 61 converts the selected items "message" and "general workers" into integers "2" and "1", respectively, and delivers the arguments (2, 1) to the document design selecting section 62.

Subsequently, when the user selects for the finished styles the "standard" formality, "high" emphasis, "standard" fancy, and "high" operativeness, the finished style specifying section 66 converts these items into arguments (2, 1, 2, 1) and delivers these arguments to the document design selecting section 62. The remaining process is identical to the previous example. In this manner, a document design form is selected from among those for "message" to "general workers" in terms of the document attribute and further selected by the arguments (2, 1, 2, 1) in terms of the finished style.

As described, the document processing system of the second embodiment has the second input section for entering the finished styles, i.e., formality, fancy, etc., in addition to the basic arrangement of the document processing system of the first embodiment, and it determines the document design by making reference to the levels of finished styles entered through the second input section by the user. Consequently, it is possible for the user having no knowledge of document design to get the intended document form by merely entering the document attributes, such as the purpose of document and the size of paper and entering the intended levels of finished styles, and the user can easily write the document by putting the content of document in the form.

In regard to the document processing systems of the first and second embodiments, it will be sometimes convenient for the user to slightly modify the document form obtained and displayed initially thereby to get the intended document form. For dealing with this matter, a "subordinate-candidates" menu is prepared as a graphical user interface and a set of pointers of document forms that are slightly different from the original one prepared in the first and second embodiments are stored in a lookup table as shown in FIG. 9.

In operation, when the user selects the subordinate-candidates menu, the document design selecting section 12 or 62 advances the pointer to the lookup table, and a document form selected by the user is displayed.

Although in the document processing systems of the first and second embodiments, data of document design forms selected by the specification of document attributes and finished styles is stored directly in the lookup table of the document design form storage section, the lookup table may store document design parameters which determine document designs. This scheme reduces the amount of data stored in the lookup table and eliminates the need of converting a selected document form into a document file which depends on the document editor. These variant arrangements will be described as the third and fourth embodiments.

Figure 10:
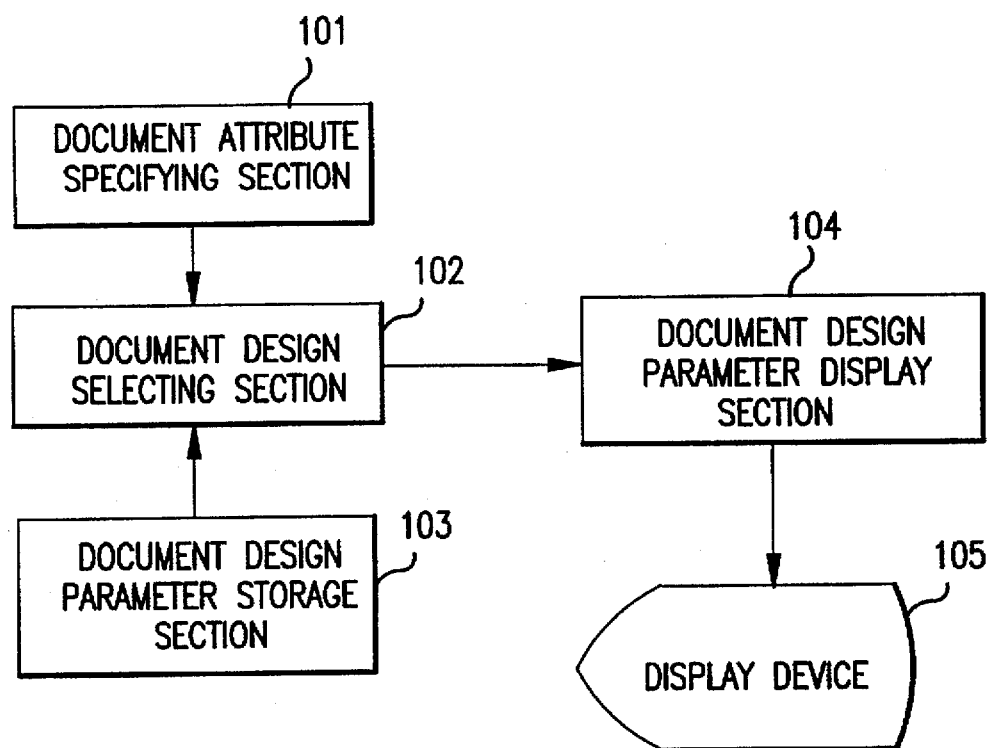
FIG. 10 is a block diagram showing the principal arrangement of the document processing system based on a third embodiment of this invention.

FIG. 10 is the block diagram of the document processing system based on the third embodiment of this invention. The document processing system consists of a document attribute specifying section 101, a document design selecting section 102, a document design parameter storage section 103, a document design parameter display section 104, and a display device 105.

The document attribute specifying section 101 is to enter document attributes indicative of the properties of document design derived from the purpose of document, distributees of document and shape of document, as in the preceding first and second embodiments. The document design parameter storage section 103 stores document parameters as information of typical document designs in correspondence to document attributes. The document design parameter storage section 103 has a structure of a lookup table, in which document design parameters are stored in correspondence to document attributes as arguments.

The document design selecting section 102 uses the values of document attributes (document attributes are represented by integers) provided by the document attribute specifying section 101 to fetch document design parameters from the document design parameter storage section 103, and delivers them in the form of a template to the document design parameter display section 104. The document design parameter display section 104 displays the template of document parameters on the display device 105. Once the template of document design parameters, e.g., document parameters of memo, is displayed, the user can proceed to write a memo by simply putting the content of memo based on the document editor without being distressed to determine the layout of the memo.

Figure 11:
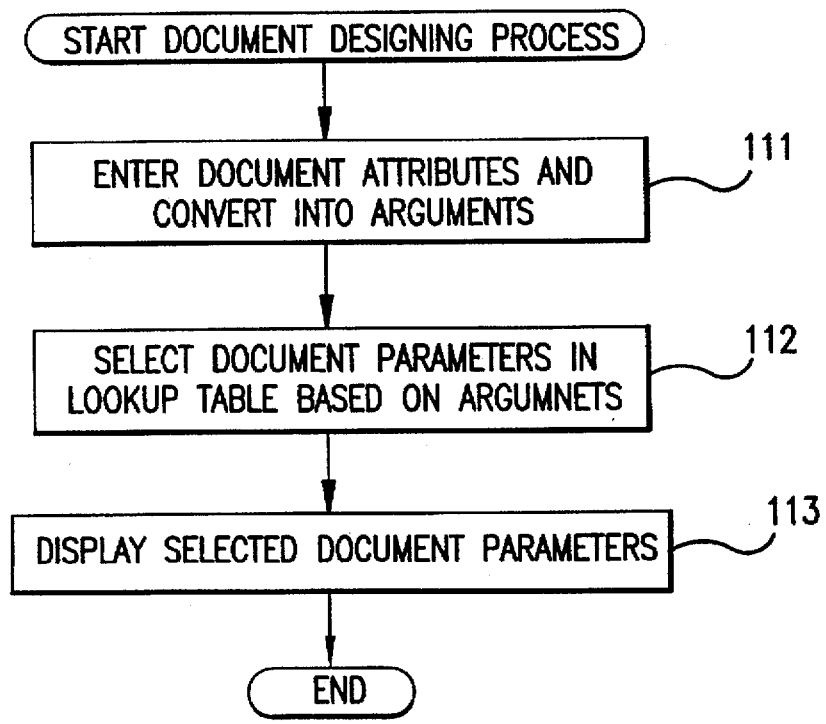
FIG. 11 is a flowchart showing the overall processing of the document designing process based on the third embodiment.

Next, the document designing process conducted by the document processing system of the third embodiment arranged as described above will be explained with reference to the flowchart of FIG. 11.

After the document designing process has started, the user enters document attributes, and these attributes are converted into arguments in step 111. At the entry of document attributes, the input function of the graphical user interface, for example, is used to display hierarchical menus for the easiness of setting operation, as in the first and second embodiments. The user specifies a series of document attributes for the type of document, distributees of document, size of paper, etc. by following the menus as explained in connection with FIGS. 3A–3D, and the entered values of document attributes are converted into arguments of the lookup table.

The next step 112 selects a template of document parameters corresponding to the specified document attributes in the lookup table in accordance with the arguments, and the last step 113 displays the selected template of document parameters. The user uses the displayed template of document parameters to write the intended document.

Next, the document writing support process will be explained more specifically. The user specifies document attributes in the menu of document attributes as shown in FIGS. 3A–3D by operating the mouse device. For example, the user selects sequentially the item "message" for the document type, the item "general workers" for the distributees, and the item "A4" for the paper size. The document attribute specifying section 101 converts the selected items of document attributes into integers and delivers them to the document design selecting section 102.

The document design selecting section 102 receives integers which represent document attributes, uses the integers as arguments to read out document design parameters from the lookup table in the document design parameter storage section 103, and delivers the readout parameters to the document design parameter display section 104.

Figure 12:
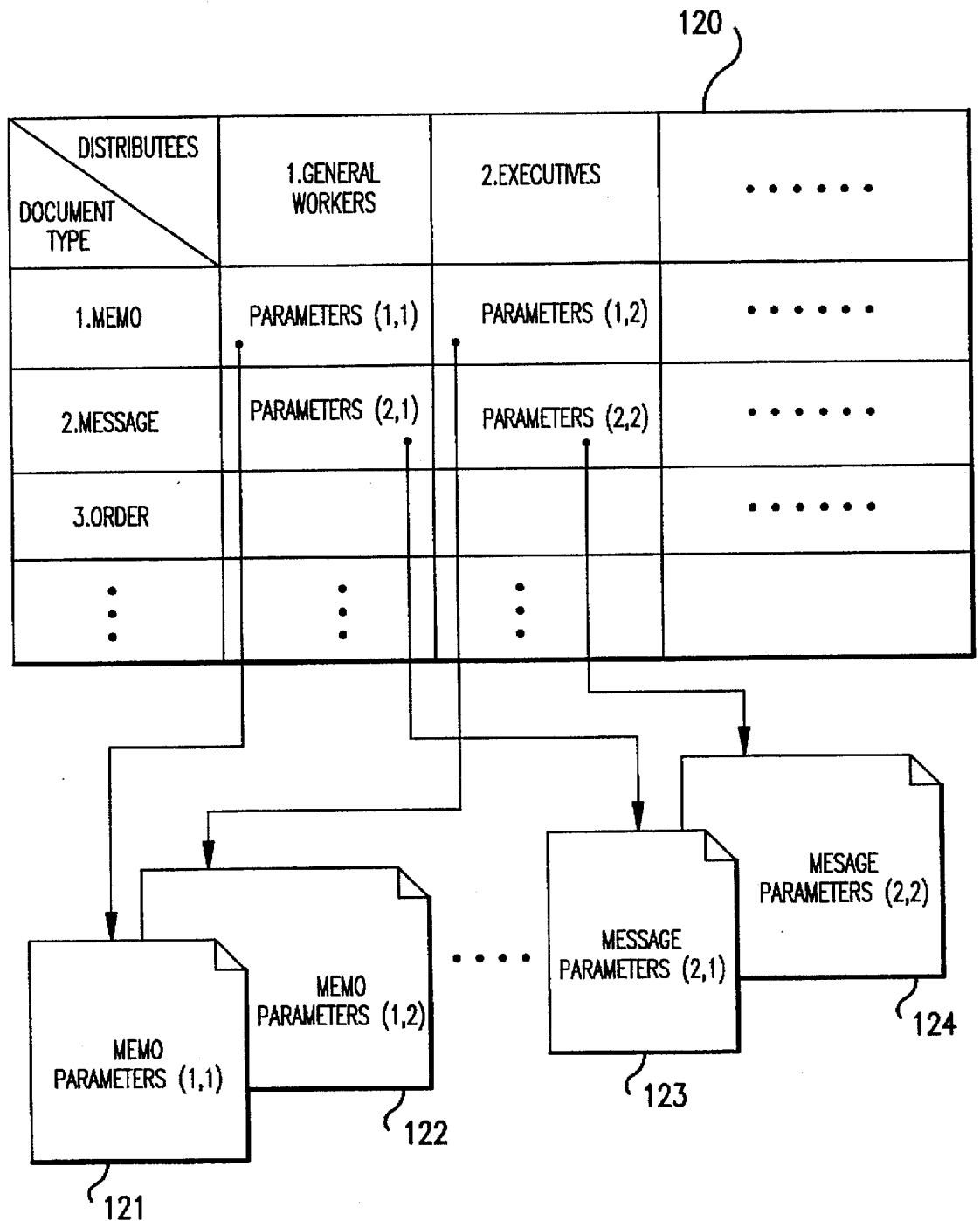
FIG. 12 is a diagram explaining the structure of the lookup table which stores document design parameters based on the third embodiment.

The lookup table in the document design parameter storage section 103 is made up of storage sections which contain pairs of document design parameters in correspondence to two kinds of arguments for the document type such as memo and message and for the distributees such as general workers and executives, e.g., memo parameters (121, 122) and message parameters (123, 124), as shown in FIG. 12. The number of document attributes, which is only two for the lookup table 120 shown in FIG. 12, is arbitrary.

Figure 13:
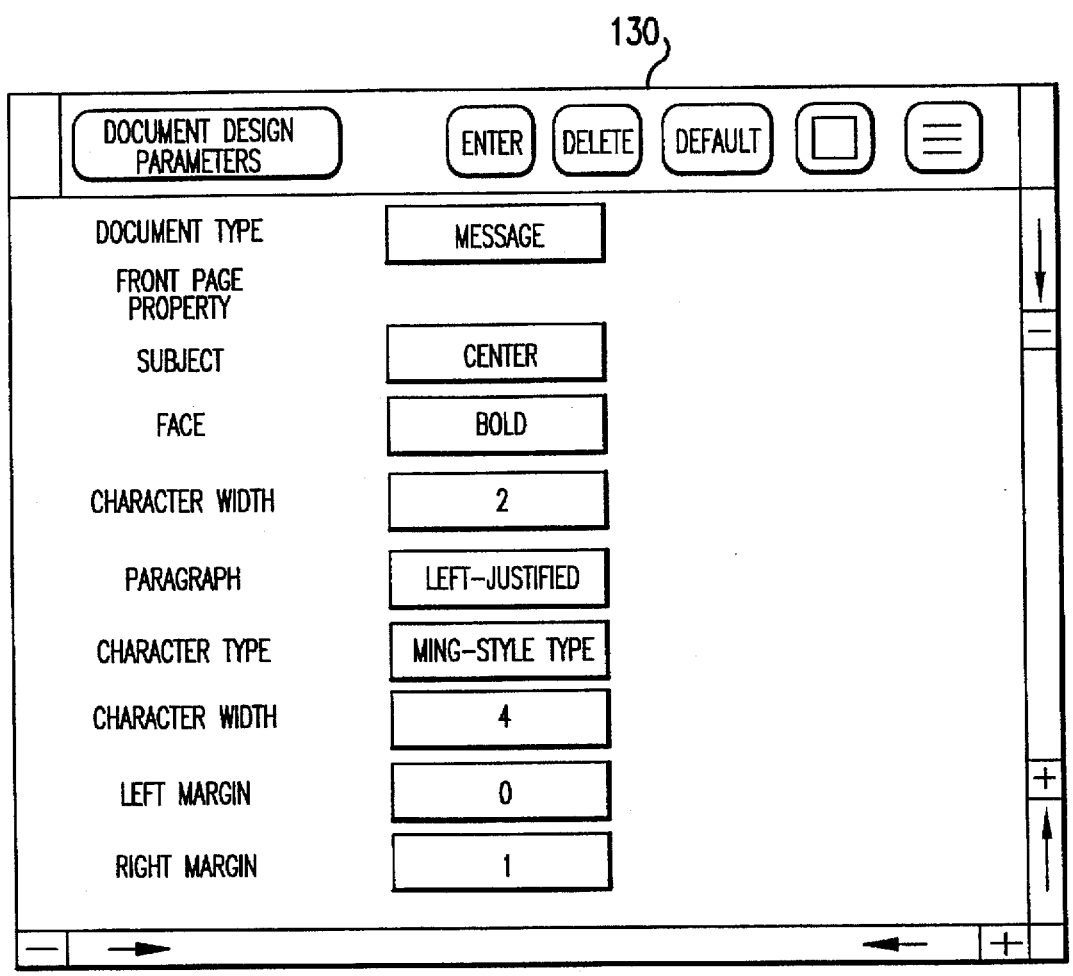
FIG. 13 is a diagram used to explain the display screen of document design parameters based on the third embodiment.

The document design parameter display section 104 displays the document design parameters provided by the document design selecting section 102 on the CRT screen of the display device 105 such that the document editor can readily use the parameters as shown in FIG. 13. In the example shown, document parameters including the character type, character width, indent, left and right margins, etc. which determine the layout of selected message-wise document are displayed. The user uses the provided document design parameters to write a message based on the document editor. It is also possible for the system to allow the user to modify the settings of parameters in the document design parameter window 130.

According to the document processing system of the third embodiment, the user enters document attribute information, e.g., document type such as message, contract or memo, which characterizes a document to be written, and the system selects document design parameters corresponding to the document attribute information in the document design parameter storage section and displays the parameters. Consequently, the user who may not have the knowledge of document design can have a proper document design parameters which meet the intended document by merely entering document attributes such as the purpose of document and paper size.

In addition to document attributes for determining document design parameters by the document processing system of the third embodiment, the system may further includes the determining process based on finished styles, which is adopted in the second embodiment derived from the first embodiment, for the determination of document design parameters, as will be described for the fourth embodiment.

Figure 14:
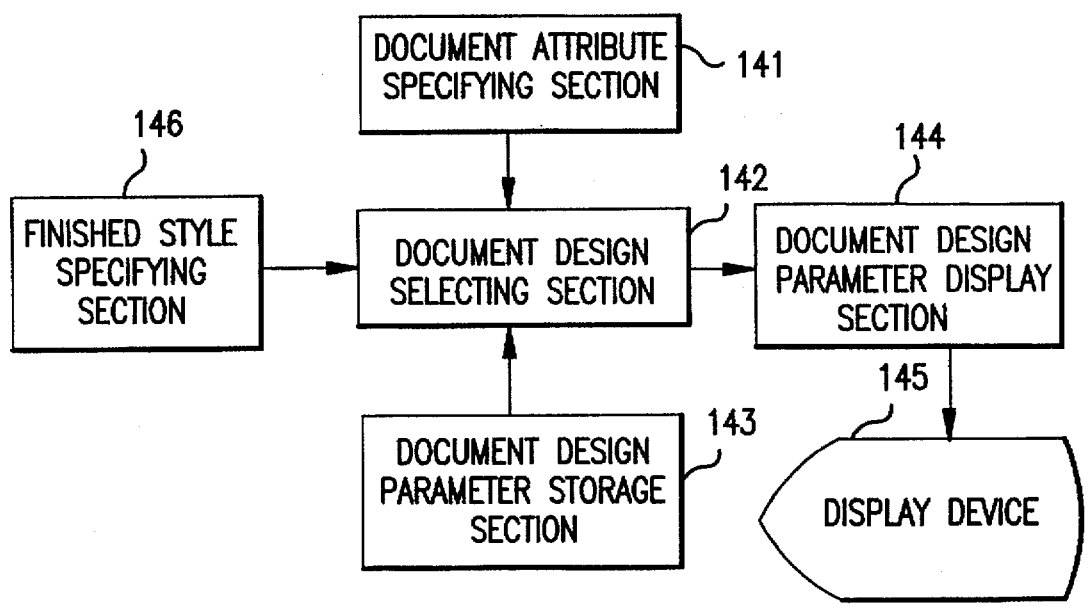
FIG. 14 is a block diagram showing the principal arrangement of the document processing system based on a fourth embodiment of this invention.

FIG. 14 is the block diagram of the document processing system based on the fourth embodiment of this invention. The document processing system consists of a document attribute specifying section 141, a document design selecting section 142, a document design parameter storage section 143, a document design parameter display section 144, a display device 145, and a finished style specifying section 146. Among these functional blocks, the document attribute specifying section 141, document design selecting section 142, document design parameter storage section 143, document design parameter display section 144 and display device 145 are identical to the document attribute specifying section 101, document design selecting section 102, document design parameter storage section 103, document design parameter display section 104 and display device 105 of the document processing system of the preceding third embodiment shown in FIG. 10.

The document processing system of the fourth embodiment is derived from the third embodiment, with the finished style specifying section 146 being added. The finished style specifying section 146 enables the user to select document design parameters based on the subjective properties of the document to be written, such as the formality, emphasis, and fancy in addition to the document attributes treated by the document attribute specifying section 141 as the first input section.

The document design selecting section 142 reads out document design parameters from the document design parameter storage section 143 by using the document attribute values (integers) provided by the document attribute specifying section 141 and also in response to the finished style levels (integers) provided by the finished style specifying section 146. The document design parameters fetched by the document design selecting section 142 is delivered in the form of a template to the document design parameter display section 144.

The document design parameter display section 144 displays the template of document design parameters, which corresponds to the specified document attribute values and specified finished style levels, on the display device 145. For example, when the user specifies the selection of a template of document design parameters for writing a message of high formality, the user can easily write the message of high formality to be distributed to executives by simply putting the content of message in accordance with the displayed document design parameters without being distressed to determine the layout of the message.

Figure 15:
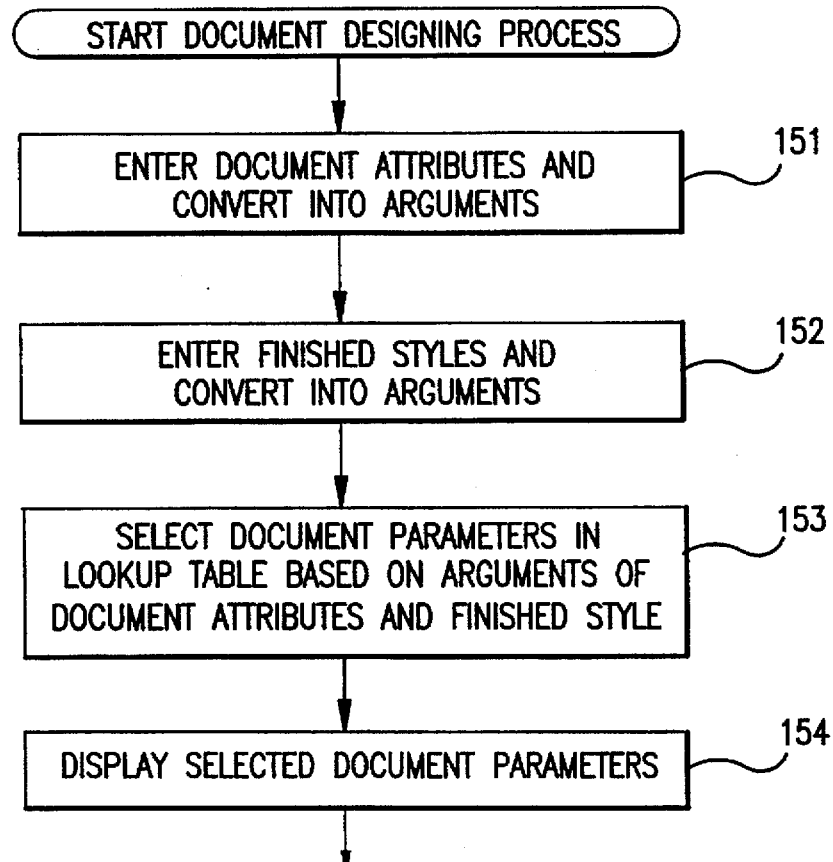
FIG. 15 is a flowchart showing the overall processing of the document designing process based on the fourth embodiment.

Next, the document designing process conducted by the document processing system of the fourth embodiment arranged as described above will be explained with reference to the flowchart of FIG. 15.

After the document designing process has started, the user enters document attributes, and these attributes are converted into arguments in step 151. At the entry of document attributes, the input function of the graphical user interface, for example, is used to display hierarchical menus for the easiness of setting operation as in the case explained in connection with FIGS. 3A-3D. The user specifies a series of document attributes for the purpose of document, type of document, distributees of document, size of paper, etc. by following the menus, and the entered values of document attributes are converted into arguments of the lookup table.

In the next step 152, the user enters finished style levels, and these are converted into arguments. Also at the entry of finished style levels, the input function of the graphical user interface is used to display hierarchical menus for the easiness of setting operation. The user specifies a series of finished styles including the formality, emphasis, fancy, operativeness, etc. by following the menus, and the entered levels of styles are converted into arguments of the lookup table in the same manner as the document attributes.

The next step 153 combines the two kinds of arguments for addressing the lookup table and reads out a template of document design parameters which corresponds to the specified document attribute values and finished style levels, and the last step 154 displays the selected template of document parameters.

Figure 16:
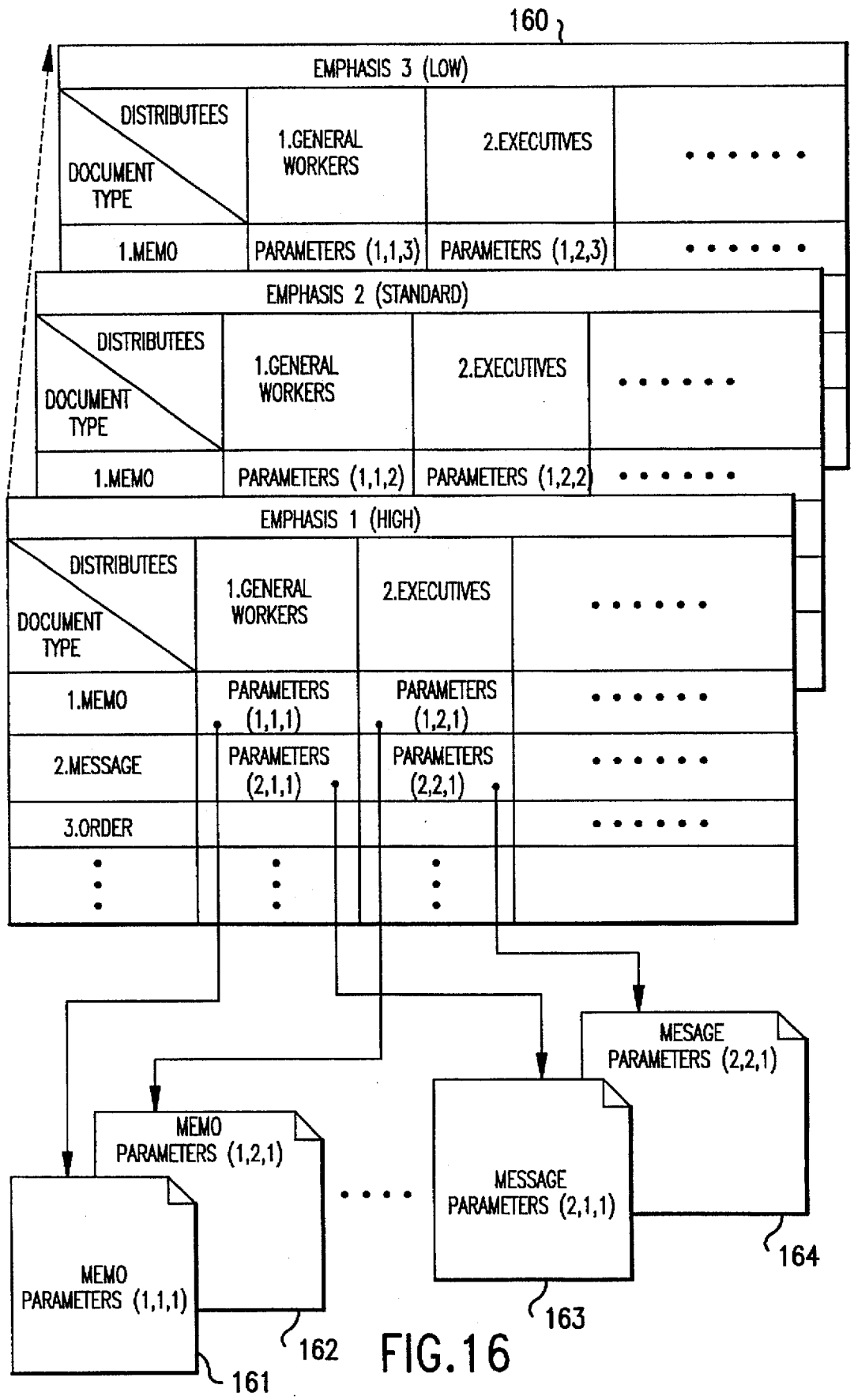
FIG. 16 is a diagram explaining the structure of the lookup table which stores document design parameters which reflect finished styles.

Next, the user's operation for specifying memo-wise document parameters, for example, based on the above-mentioned document designing process based on the finished styles will be explained more specifically in connection with FIG. 16 and FIG. 17. FIG. 16 is a diagram explaining the structure of the lookup table which contains document design parameters which reflect finished styles, and FIG. 17 is a diagram explaining an example of the display screen of selected document design parameters.

The document writing support process will be explained more specifically. The user opens the hierarchical menus for the specification of document attributes as shown in FIGS. 3A-3D in the same manner as the preceding third embodiment. For example, the user selects sequentially the item "message" for the document type, the item "general workers" for the distributees, and the item "A4" for the paper size. The document attribute specifying section 141 converts the selected items of document attributes into integers and delivers them to the document design selecting section 142.

Subsequently, the user opens the hierarchical menus of finished styles as shown in FIGS. 8A-8D, and selects the "standard" level for the formality, emphasis, fancy and operativeness. The finished style specifying section 146 converts the selected levels into integers and delivers them to the document design selecting section 142.

The document design selecting section 142 uses the received two-group values as arguments to read out document design parameters that correspond to the intended document attributes and finished styles from the lookup table in the document design parameter storage section 143, and delivers them to the document design parameter display section 144 so that the parameters are displayed on the display device 145.

The lookup table 160 of document design parameters contains first arguments of document attributes including the document type such as memo parameters (161, 162) and message parameters (163, 164) and the distributees such as general workers and executives, second arguments of finished styles such as emphasis, and address pointers of document parameters for memo-wise documents and those for message-wise documents which correspond to the first and second arguments, as shown in FIG. 16. Although the lookup table 160 includes only two document attributes, i.e., document type and distributees, and only one finished style, i.e., emphasis, the numbers of document attributes and finished styles are arbitrary.

The document design parameter display section 144 displays the document design parameters provided by the document design selecting section 142 in the document design parameter window 170 on the CRT screen of the display device 145 such that the document editor can readily use the parameters as shown in FIG. 17. In the example shown, document parameters including the character type, character width, indent, left and right margins, etc. which determine the layout of the selected message-wise document are displayed. At the same time, the document design parameter window 170 also displays the finished styles relevant to the selected document parameters.

The user uses the provided document design parameters to write a message based on the document editor. It is also possible for the system to allow the user to modify the settings of parameters in the document design parameter window 170.

According to the document processing system of this invention, as described above, the user who may not have the detailed knowledge of document design can write easily and swiftly a proper document which meets the user's intention and purpose without the need of instructing a detailed design, but by merely instructing the document attributes. Based on a variety of stored document forms or document parameters of document design in correspondence to document attributes, the user can choose a document design form or document design parameters by specifying a set of document attributes. Once a document design form is selected, the user can write a document with a good appearance by simply putting the content of document in the document form.

By specifying a set of finished styles of document together with document attributes, the user can determine an intended document design form or document design parameters without the need of instructing a detailed design. The user can modify the originally selected document design parameters, and consequently can write a document which meets the user's intention perfectly.

What is claimed is:

1. A document processing system comprising:

storage means for storing document forms which can be selected based on document attributes;

input means for entering attributes of a document;

display means for displaying a document form which is read out of said storage means in accordance with document attributes entered by said input means; and lookup table means for storing document forms that are slightly different than the document form displayed by the display means.

2. A document processing system according to claim 1, further including editing means for editing a document displayed by said display means.

3. A document processing system according to claim 1, wherein said input means enters document attributes based on a pop-up menu of the graphical user interface.

4. A document processing system according to claim 1, wherein said storage means comprises a table in which a document form can be specified based on document attributes of N in number (N is a natural number greater than one), said input means enters document attributes of N in number, and said display means displays a document form which is selected in said table in accordance with the document attributes of N in number entered by said input means.

5. A document processing system comprising:

storage means for storing document forms which can be selected based on finished styles of document;

input means for entering finished styles of a document;

display means for displaying a document form which is read out of said storage means in accordance with finished styles of document entered by said input means; and lookup table means for storing document forms that are slightly different than the document form displayed by the display means.

6. A document processing system according to claim 5, further including editing means for editing a document displayed by said display means.

7. A document processing system according to claim 5, wherein said input means enters finished styles of document based on a pop-up menu of the graphical user interface.

8. A document processing system according to claim 5, wherein said storage means comprises a table in which a document form can be specified based on finished styles of N in number (N is a natural number greater than one) among the formality, emphasis, fancy and operativeness, said input means enters finished styles of N in number, and said display means displays the document form which is selected in said table in accordance with the finished styles of N in number entered by said input means.

9. A document processing system comprising:

storage means for storing document design parameters which can be selected based on document attributes;

input means for entering attributes of a document;

display means for displaying document design parameters which are read out of said storage means in accordance with document attributes entered by said input means; and lookup table means for storing document design parameters that are slightly different than the document design parameters displayed by the display means.

10. A document processing system according to claim 9, further including editing means for editing document design parameters displayed by said display means.

11. A document processing system according to claim 9, wherein said input means enters document attributes based on a pop-up menu of the graphical user interface.

12. A document processing system according to claim 9, wherein said storage means comprises a table in which document design parameters can be specified based on document attributes of N in number (N is a natural number greater than one), said input means enters document attributes of N in number, and said display means displays the document design parameters which are selected in said table in accordance with the document attributes of N in number entered by said input means.

13. A document processing system comprising:

storage means for storing document design parameters which can be selected based on finished styles of document;

input means for entering finished styles of a document;

display means for displaying a document design parameters which are read out of said storage means in accordance with finished styles of document entered by said input means; and lookup table means for storing document design parameters that are slightly different than the document design parameters displayed by the display means.

14. A document processing system according to claim 13, further including editing means for editing a document displayed by said display means.

15. A document processing system according to claim 13, wherein said input means enters finished styles of document based on a pop-up menu of the graphical user interface.

16. A document processing system according to claim 13, wherein said storage means comprises a table in which a document design parameters can be specified based on finished styles of N in number (N is a natural number greater than one) among the formality, emphasis, fancy and operativeness, said input means enters finished styles of N in number, and said display means displays the document design parameters which are selected in said table in accordance with the finished styles of N in number entered by said input means.

* * * * *